US007787092B2

(12) United States Patent
Mizusako et al.

(10) Patent No.: US 7,787,092 B2
(45) Date of Patent: Aug. 31, 2010

(54) VERTICAL ALIGNMENT ACTIVE MATRIX LIQUID CRYSTAL DISPLAY DEVICE HAVING PARTICULAR REFLECTION METAL FILMS

(75) Inventors: Ryota Mizusako, Sagamihara (JP); Hidehiro Morita, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/410,223

(22) Filed: Mar. 24, 2009

(65) Prior Publication Data
US 2009/0185124 A1    Jul. 23, 2009

Related U.S. Application Data

(62) Division of application No. 11/237,020, filed on Sep. 28, 2005, now Pat. No. 7,542,120.

(30) Foreign Application Priority Data
Sep. 30, 2004   (JP)   ............................. 2004-288890

(51) Int. Cl.
  *G02F 1/1343* (2006.01)
  *G02F 1/1337* (2006.01)
(52) U.S. Cl. .................... 349/142; 349/129; 349/130
(58) Field of Classification Search ......... 349/142–144, 349/129, 130
See application file for complete search history.

(56) References Cited

U.S. PATENT DOCUMENTS

| 4,402,999 | A | 9/1983 | Tatsumichi et al. |
| 5,309,264 | A | 5/1994 | Lien et al. |
| 5,434,690 | A | 7/1995 | Hisatake et al. |
| 5,694,185 | A | 12/1997 | Oh |
| 5,724,107 | A | 3/1998 | Nishikawa et al. |
| 5,811,835 | A | 9/1998 | Seiki et al. |
| 6,256,082 | B1 | 7/2001 | Suzuki et al. |
| 6,285,429 | B1 | 9/2001 | Nishida et al. |
| 6,335,776 | B1 | 1/2002 | Kim et al. |
| 6,356,335 | B1 * | 3/2002 | Kim et al. .................... 349/156 |

(Continued)

FOREIGN PATENT DOCUMENTS

CN    1495492 A    5/2004

(Continued)

*Primary Examiner*—Mike Qi
(74) *Attorney, Agent, or Firm*—Frishauf, Holtz, Goodman & Chick, P.C.

(57) ABSTRACT

A liquid crystal display device comprises a TFT substrate, a CF substrate, a liquid crystal with negative dielectric anisotropy filled between the substrates, a pixel electrode provided on the TFT substrate, and an auxiliary electrode formed around the pixel electrode. A slit for segmenting a pixel region into a plurality of sub-pixel regions is formed in the pixel electrode from the center portion of each pixel toward the periphery portion thereof. The auxiliary electrode has a transparent step film formed at a position corresponding to the slit of the pixel electrode in such a way as to overlie the auxiliary electrode. Molecules of the liquid crystal of each sub-pixel region are aligned toward center of the sub-pixel region from the circumference of the sub-pixel region by a horizontal electric filed applied between the pixel electrode and auxiliary electrode, and the shape of the end portion of the transparent step film.

8 Claims, 4 Drawing Sheets

U.S. PATENT DOCUMENTS

| | | |
|---|---|---|
| 6,384,889 B1 | 5/2002 | Miyachi et al. |
| 6,449,025 B2 * | 9/2002 | Lee .................. 349/129 |
| 6,462,798 B1 * | 10/2002 | Kim et al. ............. 349/129 |
| 6,473,142 B2 | 10/2002 | Kim et al. |
| 6,507,375 B1 | 1/2003 | Kawahata |
| 6,522,379 B1 | 2/2003 | Ishihara et al. |
| 6,567,144 B1 | 5/2003 | Kim et al. |
| 6,614,492 B1 | 9/2003 | Song |
| 6,628,348 B1 | 9/2003 | Sakai et al. |
| 6,633,357 B2 | 10/2003 | Ko et al. |
| 6,650,390 B2 | 11/2003 | Sakamoto et al. |
| 6,654,090 B1 | 11/2003 | Kim et al. |
| 6,661,488 B1 | 12/2003 | Takeda et al. |
| 6,671,020 B2 * | 12/2003 | Kim et al. ............. 349/129 |
| 6,680,769 B1 | 1/2004 | Lee et al. |
| 6,710,825 B2 | 3/2004 | Kubo et al. |
| 6,710,837 B1 | 3/2004 | Song et al. |
| 6,724,452 B1 | 4/2004 | Takeda et al. |
| 6,727,969 B2 | 4/2004 | Chang et al. |
| 6,738,120 B1 | 5/2004 | Song et al. |
| 6,747,722 B2 | 6/2004 | Ono et al. |
| 6,750,933 B1 | 6/2004 | Yakovenko et al. |
| 6,750,935 B2 | 6/2004 | Seo et al. |
| 6,757,040 B1 | 6/2004 | Kim et al. |
| 6,760,089 B1 | 7/2004 | Kuroha |
| 6,778,244 B2 | 8/2004 | Song et al. |
| 6,853,427 B2 | 2/2005 | Park et al. |
| 6,879,364 B1 | 4/2005 | Sasaki et al. |
| 6,900,863 B2 | 5/2005 | Okamoto et al. |
| 6,940,574 B2 | 9/2005 | Lee et al. |
| 6,950,158 B2 | 9/2005 | Chang |
| 7,019,805 B2 | 3/2006 | Kim et al. |
| 7,064,803 B2 | 6/2006 | Okazaki et al. |
| 7,247,411 B2 | 7/2007 | Song |
| 2001/0004274 A1 | 6/2001 | Sakamoto et al. |
| 2001/0007487 A1 | 7/2001 | Yoon et al. |
| 2001/0022643 A1 | 9/2001 | Kim et al. |
| 2001/0024257 A1 | 9/2001 | Kubo et al. |
| 2002/0036740 A1 | 3/2002 | Kubo et al. |
| 2002/0071081 A1 | 6/2002 | Cheng |
| 2002/0075437 A1 | 6/2002 | Fukumoto et al. |
| 2002/0080320 A1 | 6/2002 | Suzuki et al. |
| 2002/0149728 A1 | 10/2002 | Ogishima et al. |
| 2002/0180901 A1 | 12/2002 | Kim |
| 2002/0180920 A1 | 12/2002 | Noh et al. |
| 2003/0030769 A1 | 2/2003 | Hong et al. |
| 2003/0071930 A1 | 4/2003 | Nagahiro |
| 2003/0112398 A1 | 6/2003 | Kim et al. |
| 2003/0147027 A1 | 8/2003 | Wachi |
| 2004/0046907 A1 | 3/2004 | Ham et al. |
| 2004/0046914 A1 | 3/2004 | Hirota |
| 2004/0046915 A1 | 3/2004 | Takeda et al. |
| 2004/0075780 A1 | 4/2004 | Lee |
| 2004/0090580 A1 | 5/2004 | Liao et al. |
| 2004/0105058 A1 | 6/2004 | Lu |
| 2004/0189914 A1 | 9/2004 | Matsuyama |
| 2004/0246416 A1 | 12/2004 | Maeda |
| 2005/0007529 A1 | 1/2005 | Kim et al. |
| 2005/0068482 A1 | 3/2005 | Kume et al. |
| 2005/0099572 A1 | 5/2005 | Ahn et al. |
| 2005/0151893 A1 | 7/2005 | Hong et al. |
| 2005/0151907 A1 | 7/2005 | Maeda |
| 2005/0206795 A1 | 9/2005 | Shin et al. |
| 2006/0012741 A1 * | 1/2006 | Mizusako ............ 349/130 |
| 2006/0044501 A1 * | 3/2006 | Mizusako ............ 349/123 |
| 2006/0066791 A1 | 3/2006 | Mizusako et al. |
| 2006/0082709 A1 | 4/2006 | Hung et al. |
| 2006/0114397 A1 | 6/2006 | Mizusako et al. |
| 2006/0114405 A1 | 6/2006 | Yamaguchi et al. |
| 2006/0139541 A1 | 6/2006 | Yamaguchi et al. |
| 2006/0139542 A1 | 6/2006 | Ando et al. |
| 2006/0164565 A1 | 7/2006 | Lee et al. |

FOREIGN PATENT DOCUMENTS

| | | |
|---|---|---|
| CN | 1641424 | 7/2005 |
| JP | 06-043461 B2 | 2/1994 |
| JP | 10-274771 A | 10/1998 |
| KR | 0148502 B1 | 5/1998 |
| KR | 2000-0056511 A | 9/2000 |
| KR | 2000-0059783 A | 10/2000 |
| KR | 2001-0039258 A | 5/2001 |
| KR | 2001-0069132 A | 7/2001 |
| KR | 2002-0020457 A | 3/2002 |
| KR | 2002-0084097 A | 11/2002 |
| KR | 2003-0044872 A | 6/2003 |
| KR | 2003-0058012 A | 7/2003 |
| TW | 510981 | 11/2002 |
| TW | 569168 | 1/2004 |
| TW | 594310 | 6/2004 |
| TW | 200422710 A | 11/2004 |
| TW | 200612138 A | 4/2006 |
| WO | WO 03/032067 A1 | 4/2003 |
| WO | WO 03/096114 A1 | 11/2003 |

* cited by examiner

VERTICAL ALIGNMENT ACTIVE MATRIX LIQUID CRYSTAL DISPLAY DEVICE HAVING PARTICULAR REFLECTION METAL FILMS

RELATED APPLICATIONS

The present application is a Divisional Application of U.S. application Ser. No. 11/237,020 filed Sep. 28, 2005 now U.S. Pat. No. 7,542,120, which is based on Japanese Patent Application No. 2004-288890 filed on Sept. 30. 2004 the disclosures of both of which are incorporated herein by reference.

BACKGROUND OF THE INVENTION

1. Field of the Invention

The present invention relates to a vertical alignment active matrix liquid crystal display device whose liquid crystal molecules are aligned vertical to the surface of a substrate.

2. Description of the Related Art

A conventional TFT liquid crystal panel comprises a TFT (Thin Film Transistor) substrate on which TFTs and pixel electrodes and the like are formed, a CF (Color Filter) substrate on which color filters and an opposing electrode are formed, and a liquid crystal layer which is sandwiched between those substrates. A TFT liquid crystal display panel which has liquid crystal molecules homogeneously aligned, such as a TN (Twisted Nematic) liquid crystal display device, uses a material with a positive dielectric anisotropy. A TFT liquid crystal display panel which has liquid crystal molecules homeotropically aligned uses a material with a negative dielectric anisotropy, and aligns the director (molecular long axis direction) perpendicular to the substrate with no electric field formed (initial aligned state).

In the vertical alignment TFT liquid crystal display device whose liquid crystal molecules are homeotropically aligned in the initial aligned state, a vertical alignment film is formed on the inner surface of each of a pair of substrates arranged opposite to each other, and a liquid crystal with the negative dielectric anisotropy is filled between the substrates, thereby constituting a liquid crystal cell.

In the liquid crystal cell, a plurality of pixel electrodes are formed on one of the pair of substrates, and an opposing (common) electrode which faces the picture electrodes is formed on the other substrate, with one pixel being formed by each pixel electrode, the opposing portion of the common electrode, and the liquid crystal therebetween. A vertical alignment film, which is rubbed to define a direction in which the liquid crystal molecules tilt when a voltage is applied between the pixel electrode and the opposing electrode, is so formed on each substrate as to cover the pixel electrode and the opposing electrode.

In a case where no voltage is applied between the pixel electrode and the opposing electrode, because the opposing electrode and the pixel electrode have the same electric potential, no electric field is formed between those electrodes, and the action of the vertical alignment film causes the liquid crystal molecules to be aligned vertical to the substrate.

When a voltage is applied between the pixel electrode and the opposing electrode, the liquid crystal molecules behave to tilt because of the electric field formed between those electrodes. When a sufficiently high voltage is applied between the pixel electrode and the opposing electrode, the liquid crystal molecules are aligned substantially horizontal to the substrate.

In this case, when a voltage is applied between the pixel electrode and the opposing Electrode, the liquid crystal molecules are aligned along one direction due to the electric field formed between those electrodes, and alignment restricting force of the alignment process. This results in a large view angle dependency of the contrast and a poor view angle characteristic.

To obtain a wide view angle characteristic in the vertical alignment liquid crystal display apparatus, it is proposed to form a plurality of domains where the liquid crystal molecules are aligned along plural directions pixel by pixel. For instance, as described in the specification of Japanese Patent Publication No. 2565639, a liquid crystal display apparatus proposed has the opposing electrode formed with an aperture with the shape of a letter X, so that the liquid crystal molecules in each pixel are so aligned as to tilt toward the center of the X-shaped aperture along the four directions when a voltage is applied between the two electrodes facing each other.

In this liquid crystal display apparatus, the opposing electrode is formed larger than the pixel electrode, and when a voltage is applied between the pixel electrode and the opposing electrode, a vertical electric field (an electric field vertical to the substrate) is generated at that portion of the pixel region where the pixel electrode faces the opposing electrode, and an oblique electric field is generated at the peripheral portion of the pixel electrode, thereby forming a discontinuous electric field portion at that portion of the opposing electrode where the slit is formed. The liquid crystal molecules are aligned to tilt toward the center of the X-shaped aperture due to the discontinuous electric field portion. That is, in this liquid crystal display apparatus, the liquid crystal molecules arc so aligned as to tilt along the tour directions for each pixel and for each region defined by the X-shaped aperture.

According to the above-described liquid crystal display apparatus, however, because the X-shaped aperture formed in each pixel forms regions with different alignment directions, the X-shaped aperture should be formed wide enough to prohibit the interaction between the regions. Accordingly, in each pixel, the area of the aperture (slit) which is not controllable by the electric field becomes large, and the area of the opposing electrode becomes small, resulting in a low aperture ratio.

SUMMARY OF THE INVENTION

It is an object of the present invention is to provide a liquid crystal display device whose liquid crystal molecules holds a stable alignment state and has a wide view angle, and a high contrast.

To achieve the object, a liquid crystal display device according to the first aspect of the present invention comprises:

a first substrate provided with a first electrode;

a second substrate provided with at least one second electrode, which is arranged opposite to the first electrode with a predetermined gap therebetween, and which forms an individual pixel region in which the second electrode faces the first electrode;

an auxiliary electrode formed on a surface of the second substrate on which the second electrode is provided, along at least a periphery of the pixel region;

a vertical alignment film formed on each of opposing inner surfaces of the first electrode and the second electrode;

a liquid crystal layer with a negative dielectric anisotropy filled between the first and second substrates;

an aperture, formed in at least one of the first electrode and the second electrode for the pixel region, for segmenting the pixel region into a plurality of sub-pixel regions; and a transparent step film comprising a transparent member which overlaps the auxiliary electrode on the surface of the second substrate on which the second electrode is provided, along at least the periphery of the pixel region, wherein the transparent step film forms an inclined surface which protrudes from the surface on which the second electrode is formed, and wherein the inclined surface is formed at the periphery of the pixel region on the surface on which the second electrode is provided such that liquid crystal molecules of the liquid crystal layer arc aligned to tilt toward an inner side of the pixel region.

In the liquid crystal display device according to the first aspect the force which causes the liquid crystal molecules to tilt toward the center thereof from the peripheral evenly acts from the circumference of the sub-pixel region so that the center of the alignment of the liquid crystal molecules is defined for each sub-pixel region, and the alignment of the liquid crystal molecules in each sub-pixel region is stabilized. This results in the elimination of the display roughness and display unevenness, thus providing bright display. As the liquid crystal molecules are radially aligned from the center of each sub-pixel region sub-pixel region by sub-pixel region, the view angle characteristic is improved.

It is preferable that the auxiliary electrode should have a aperture auxiliary electrode laid out at a portion corresponding to the aperture of the second electrode, and be formed in such a way as to surround each of the plurality of sub-pixel regions segmented by the aperture. In this case, the aperture auxiliary electrode should be formed by a transparent conductive film.

It is preferable that the transparent step film should have an aperture step film positioned at a portion corresponding to the aperture of the second electrode and overlying the auxiliary electrode.

A liquid crystal display device according to the second aspect of the invention comprises:

a first substrate provided with a first electrode;

a second substrate provided with at least one second electrode, which is arranged opposite to the first electrode with a predetermined gap therebetween, and which forms an individual pixel region in which the second electrode faces the first electrode;

a first auxiliary electrode formed on a surface of the second substrate on which the second electrode is provided, along at least a periphery of the pixel region;

a vertical alignment film formed on each of opposing inner surfaces of the first electrode and the second electrode;

a liquid crystal layer with a negative dielectric anisotropy filled between the first and second substrates;

a slit, formed in the second electrode for segmenting each pixel region into a plurality of sub-pixel regions so that molecular long axes of liquid crystal molecules of the liquid crystal layer are aligned toward a center of each of the plurality of sub-pixel regions from a circumference thereof by an electric field generated in the slit;

a second auxiliary electrode which is insulated from the second electrode, and which is formed on the surface of the second substrate on which the second electrode is provided, at a position corresponding to the slit;

a first transparent step film comprising a transparent member which overlaps the first auxiliary electrode on the surface of the second substrate on which the second electrode is provided, along at least the periphery of the pixel region, wherein the First transparent step film forms a first inclined surface which protrudes from the surface on which the second electrode is formed, and wherein the first inclined surface is formed at the periphery of the pixel region on the surface on which the second electrode is provided such that the liquid crystal molecules of the liquid crystal layer are aligned to tilt toward inner sides of the sub-pixel regions; and a second transparent step film comprising a transparent member which overlaps the second auxiliary electrode on the surface of the second substrate on which the second electrode is provided, wherein the second transparent step film forms a second inclined surface which protrudes from the surface on which the second electrode is formed, and wherein the second inclined surface is formed at peripheries of the sub-pixel regions on the surface on which the second electrode is provided such that the liquid crystal molecules of the liquid crystal layer are aligned to tilt toward the inner sides of the sub-pixel regions.

In the liquid crystal display device according to the second aspect the force which causes the liquid crystal molecules to tilt toward the center thereof from the peripheral evenly acts from the circumference of the sub-pixel region, so that the center of the alignment of the liquid crystal molecules is defined for each sub-pixel region, and the alignment of the liquid crystal molecules in each sub-pixel region is stabilized. As a result, it is possible to eliminate the display roughness and display unevenness thereby providing bright display. As the liquid crystal molecules are radially aligned from the center of each sub-pixel region sub-pixel region by sub-pixel region. the view angle characteristic is improved.

It is preferable that in the liquid crystal display device according to the second aspect the slit should comprise a plurality of cutaway portions extending toward a periphery of each pixel region from a center thereof, and connected to one another at a center portion of the pixel region.

It is desirable that the first auxiliary electrode should be set to a potential lower than that of the second electrode. It is preferable that the first auxiliary electrode should be set to a potential equal to a potential of the first electrode facing the second electrode.

It is desirable that the first auxiliary electrode should comprise a compensating-capacitor electrode which overlies a peripheral portion of the second electrode and forms a compensating capacitor between the compensating-capacitor electrode and the second electrode. It is further preferable that the second auxiliary electrode should be connected to the first auxiliary electrode. It is preferable that the second auxiliary electrode should comprise a transparent conductive film.

It is desirable that each of the first and second transparent step films should have a scatter reflection film formed on a top surface thereof. In this case, it is preferable that a recess and protrusion portion should be formed on a top surface of each of the first and second transparent step films, and a metal film which scatters and reflects light should be formed on the recess and protrusion portion.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Liquid crystal display devices according to embodiments of the present invention will be described below with reference to the accompanying drawings.

First Embodiment

Figure 1:
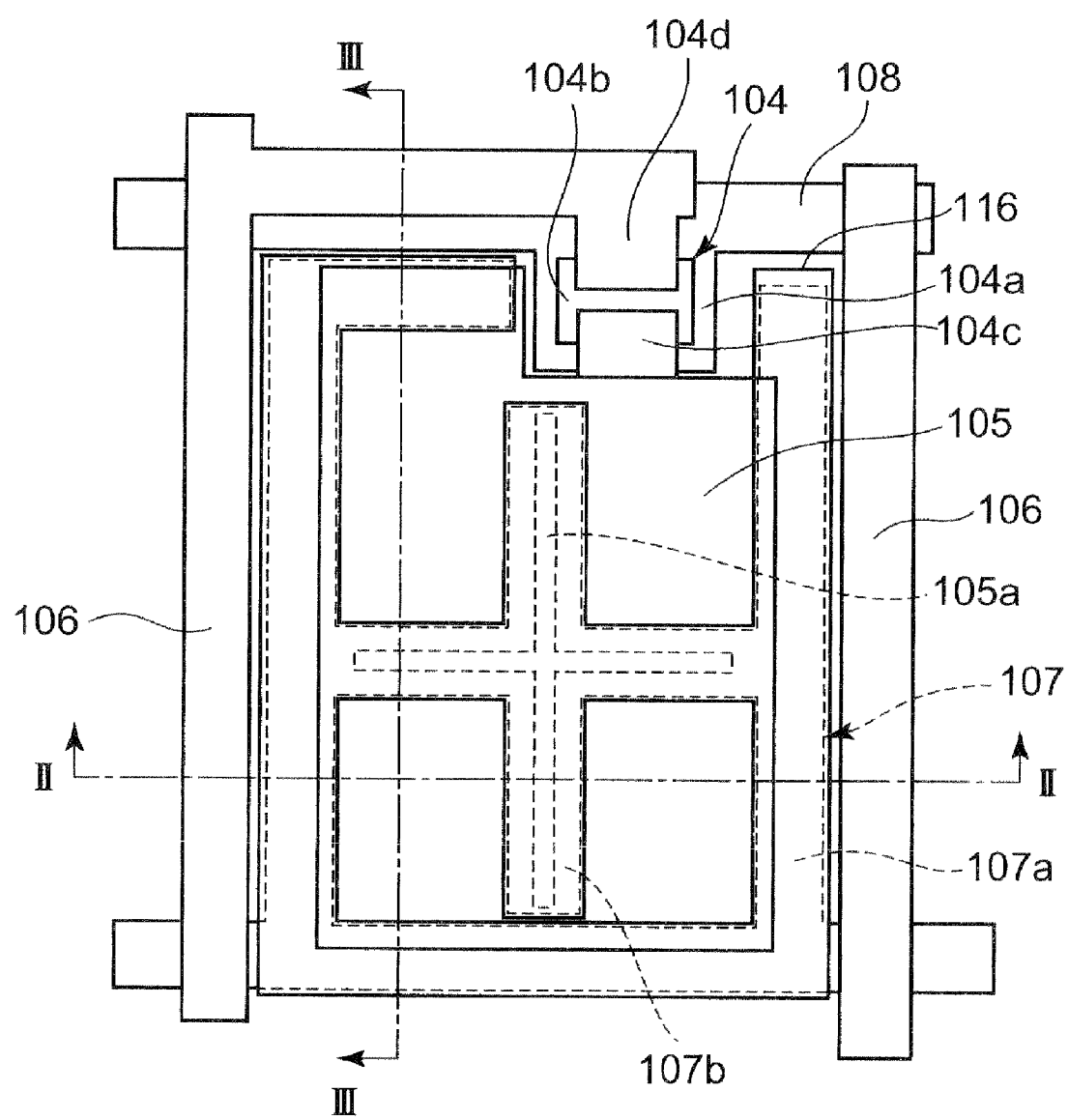
FIG. 1 is a top plan view schematically illustrating the structure of one pixel of a vertical alignment liquid crystal display device according to a first embodiment of the invention.
Figure 2:
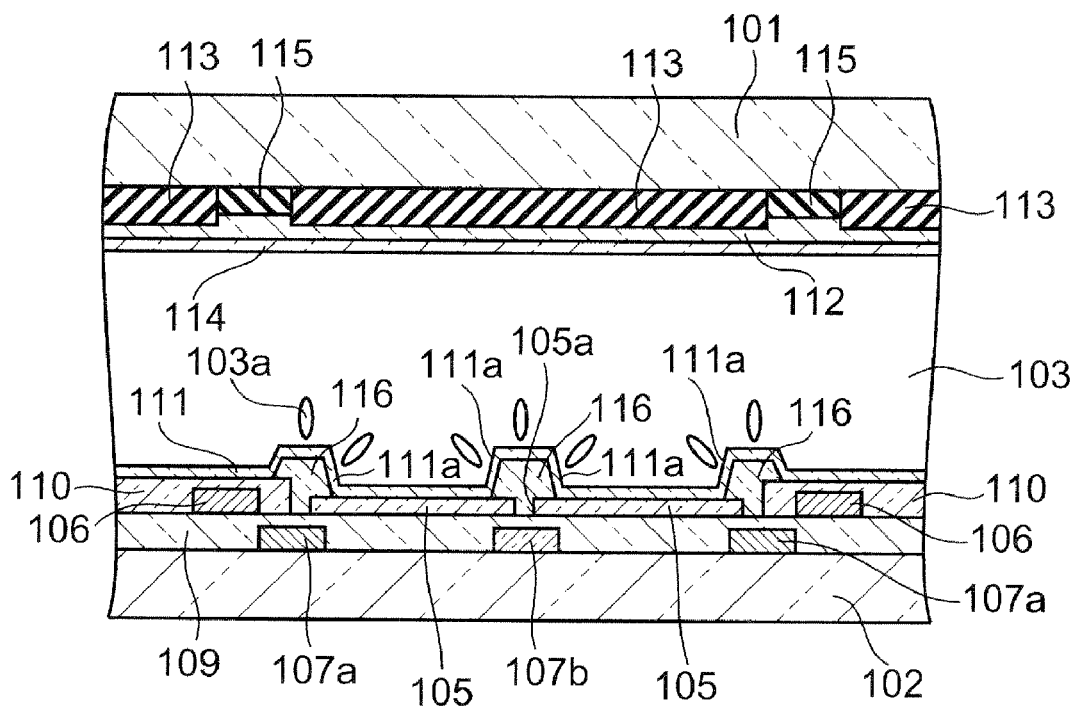
FIG. 2 is a cross-sectional view of one pixel illustrated in FIG. 1 cut along the line II-II.
Figure 3:
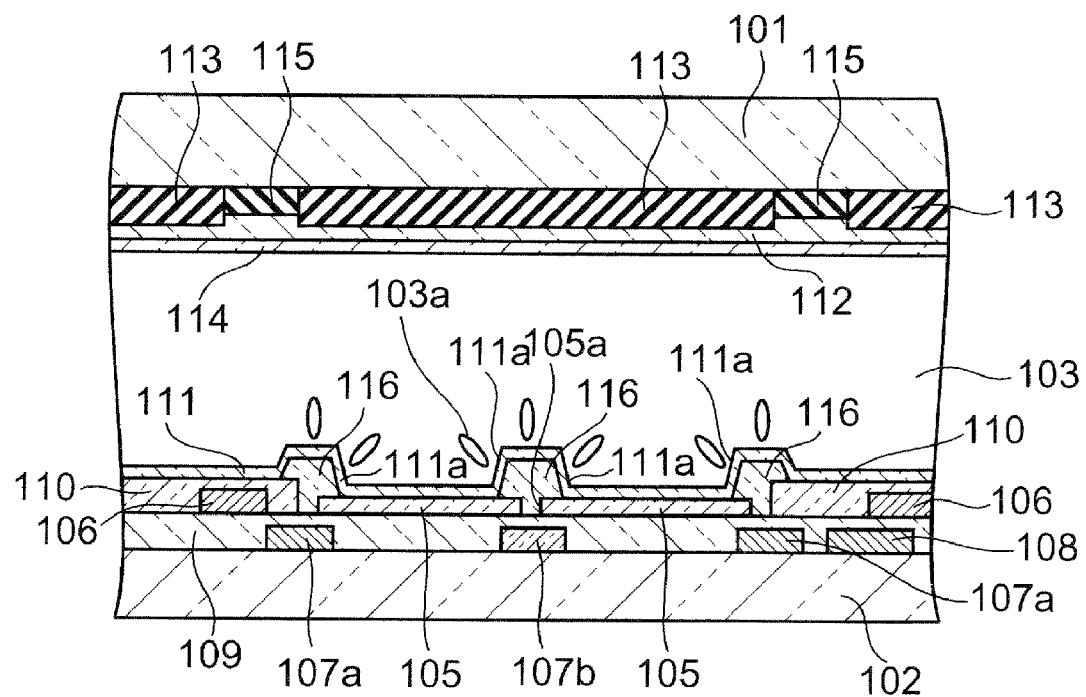
FIG. 3 is a cross-sectional view of one pixel illustrated in FIG. 1 cut along the line III-III.

FIG. 1 is a top plan view schematically illustrating one pixel structure of a vertical alignment liquid crystal display device according to the first embodiment of the invention. FIG. 2 is a cross-sectional view of one pixel illustrated in FIG. 1 cut along the line II-II. FIG. 3 is a cross-section-al view of one pixel illustrated in FIG. 1 cut along the line III-III.

The liquid crystal display device comprises a pair of glass substrates 101 and 102, arranged opposite to each other, and a liquid crystal 103 with the negative dielectric anisotropy, filled between one glass substrate 102 (hereinafter called TFT substrate 102) and the other glass substrate 101 (hereinafter called opposing substrate 101).

Formed on the surface of the TFT substrate 102 opposing the opposing substrate 101 are TFT devices 104, pixel electrodes 105, drain lines 106, auxiliary electrodes 107, gate lines 108, a gate insulation film 109, an insulation film 110, and an alignment film 111. Formed on the inner surface of the opposing substrate 101 are an opposing electrode 112, a color filter 113 an alignment film 114, and a black mask 115.

The TFT device 104 is an inversely staggered thin film transistor which is formed on the glass substrate 102. The TFT device 104 has a gate electrode 104a, a semiconductor layer 104b, a source electrode 104c, and a drain electrode 104d.

The pixel electrode 105 is formed by an approximately quadrangle transparent electrode which comprises, for example, an ITO film essentially consisting of an indium oxide. The pixel electrode 105 defines the region of a single pixel, which is the smallest unit for forming an image, with that region which opposes the opposing electrode 112. A narrow aperture 105a for segmenting each pixel into a plurality of sub-pixel regions is formed in the pixel electrode 105 for each pixel. The aperture 105a comprises a plurality of slits which extend from the center of the pixel electrode 105 to the periphery thereof, and are connected to one another at the center of the pixel electrode 105 (hereinafter, the aperture will be called slit).

In the embodiment, the slits 105a are formed into a cross shape by incising the pixel electrode 105 in such a way as to extend along the vertical and horizontal directions from the center portion of the pixel electrode 105, and segment one pixel region into four sub-pixel regions.

A transparent step film 116 of a transparent resin material, such as acrylic resin is provided on at the periphery portion of the pixel electrodes 105 and on the slits 105a in such a way as to form a projection protruding from the surface of the pixel electrode 105. specifically, one pixel region, defined by one pixel electrode 105 and that region which faces the opposing electrode 112, is separated into four sub-pixel regions by the slits 105a provided on the pixel electrode 105 and the transparent step film 116 formed thereon, and an inclined surface 111a is formed on the alignment film 111 at the periphery of each sub-pixel region by the end face of the transparent step film 116 protruding from the film surface of the of the pixel electrode 105.

The drain line 106 of the liquid crystal display panel of the embodiment comprises an aluminum line or the like which is so formed as to run along the column direction for each column of pixels. The drain line 106 is connected to the drain electrodes 104d of the TFT devices 104 in the same pixel column, and supplies the image signal from a column driver to the pixel electrode 105, via the enabled TFT devices 104.

The auxiliary electrode 107 comprises a peripheral auxiliary electrode 107a, which partly overlies the peripheral portion of the pixel electrode 105 via the gate insulation film 109 and is made of a metal, such as aluminum and a slit auxiliary electrode 107b, which is formed by a transparent conductive film of ITO or the like into a shape corresponding to the shape of the slits 105a formed on the pixel electrode 105. The auxiliary electrode 107 is kept at a predetermined electric potential lower than that of the pixel electrode 105, and more preferably, is set at the same electric potential as that of the opposing electrode 112, and, together with the pixel electrode 105, forms the compensating capacity which is connected in parallel to a pixel capacitor, formed by each pixel electrode 105, the opposing electrode 112 and the liquid crystal 103.

The gate line 108 comprises an aluminum line or the like which is so formed as to run along the row direction for each pixel row, and electrically insulated from the other electrodes by the gate insulation film 109, The gate line 108 is connected to the gate electrodes 104a of the TFT devices 104 in the corresponding pixel row, supplies a scan signal to the TFT devices 104. and controls the ON/OFF actions of the TFT devices 104.

The gate insulation film 109 is formed on the substrate 102 on which the gate electrodes 104a of the TFT devices 104, the gate line 108, and the auxiliary electrode 107 are formed, and comprises, for example, a silicon nitride film. The gate insulation film 109 electrically insulates the gate electrode 104a of the TFT device 104 from the semiconductor layer 104b and the source/drain electrodes 104c, and 104d which are opposite to that gate electrode. The source electrode 104c of the TFT device 104 is connected to the corresponding pixel electrode 105, and the drain electrode 104d of the TFT device 104 is connected to the corresponding drain line 106.

The insulation film 110, which covers the drain line 106, is formed between the pixel electrode 105 and that of the neighboring pixel, and comprises, for example, a silicon nitride film. As the insulation film 110 is formed thicker than the pixel electrode 105, the thickness of the peripheral region of the pixel region (the thickness of the insulation film 110 and the alignment film 111) becomes greater than the thickness of the pixel region (the thickness of the pixel electrode 105 and the alignment film 111).

Each of the alignment films 111 and 114 comprises hexamethyldisiloxane-polymerization film or the like which is formed by coating and baking of an organic vertical alignment material, or CVD (Chemical Vapor Deposition). The alignment films 111 and 114 are so formed as to respectively cover the pixel electrode 105 and the opposing electrode 112. The liquid crystal 103 is filled between those alignment films 111 and 114. The alignment films 111 and 114 are not rubbed, and the liquid crystal molecules near their surfaces are vertically aligned to the alignment film surface when no electric field is generated.

Next, the method of manufacturing the liquid crystal display device with the above-described structure will be explained.

An aluminum-based metal film is formed on the one glass substrate 102, and patterned to form the gate electrodes 104a of the TFT devices 104, the gate lines 108, and the auxiliary electrodes 107 (including the lines which mutually connect the auxiliary electrodes 107). Next, the gate insulation film 109 is formed by CVD. Subsequently, channel layers (semiconductor layers), the source regions, the drain regions, etc. of the TFT devices 104 are formed on the gate insulation film 109.

An ITO film is formed on the gate insulation film 109 by sputtering. The ITO film is etched and patterned, excluding that portion of the ITO film which constitutes the pixel region, yielding the pixel electrodes 105 each formed with the narrow slits 105a cut away extending toward the peripheral portion of the pixel region from the central portion thereof.

The drain lines 106 are formed on the gate insulation film 109, apart from the peripheries of the pixel electrodes 105, and are connected to the drain electrodes 104d of the TFT devices 104. The insulation film 110 is formed on the gate insulation film 109 in such a manner as to cover the drain lines 106 formed on non-pixel regions around the pixel electrodes 105.

Next, a photoresist liquid containing a transparent resin material, such as acrylic resin, is coated on the inner surface of the TFT substrate 102, and is exposed in a pattern to form the transparent step film 116. Subsequently, the alignment film 111 is formed on the entire surface of the substrate by CVD, spin coating, or the like.

The TFT substrate 102 thus formed and the opposing substrate 101 on which the opposing electrode 112, the color filter 113. etc. are formed, are arranged opposite to each other with a non-illustrated spacer sandwiched therebetween, and their peripheries are sealed by a seal material, thereby forming each liquid crystal cell. Next, the liquid crystal with the negative dielectric anisotropy is filled in the liquid crystal cell, and a liquid-crystal inlet is sealed. Non-illustrated polarizing plates are placed on the outer surfaces of the TFT substrate 102 and the opposing substrate 101, thereby fabricating the liquid crystal display device.

Next, the behavior of the liquid crystal molecules in the pixel with the above-described stricture will be explained.

One pixel region is defined by a region where one pixel electrode 105 and the opposing electrode 112 face each other, and segmented into four sub-pixel regions by the plural slits 105a formed on the pixel electrode 105. As the periphery of one sub-pixel region is surrounded by the peripheral auxiliary electrode 107a, and the slit auxiliary electrode 107b is laid out in association with the slits 105a, approximately the entire circumference of the sub-pixel region is surrounded by the peripheral auxiliary electrode 107a and the slit auxiliary electrode 107b. When a voltage is applied between the pixel electrode 105 and the auxiliary electrode 107, an electric field (horizontal electric field) nearly in parallel to the substrate surface is generated around each sub-pixel region.

As each sub-pixel region is surrounded around by the transparent step film 116. and the inclined surface 111a directed toward the center of the sub-pixel region is formed around the sub-pixel region. As shown in FIGS. 2 and 3, liquid crystal molecules 103a are aligned vertical to the inclined surface 111a.

Figure 4:
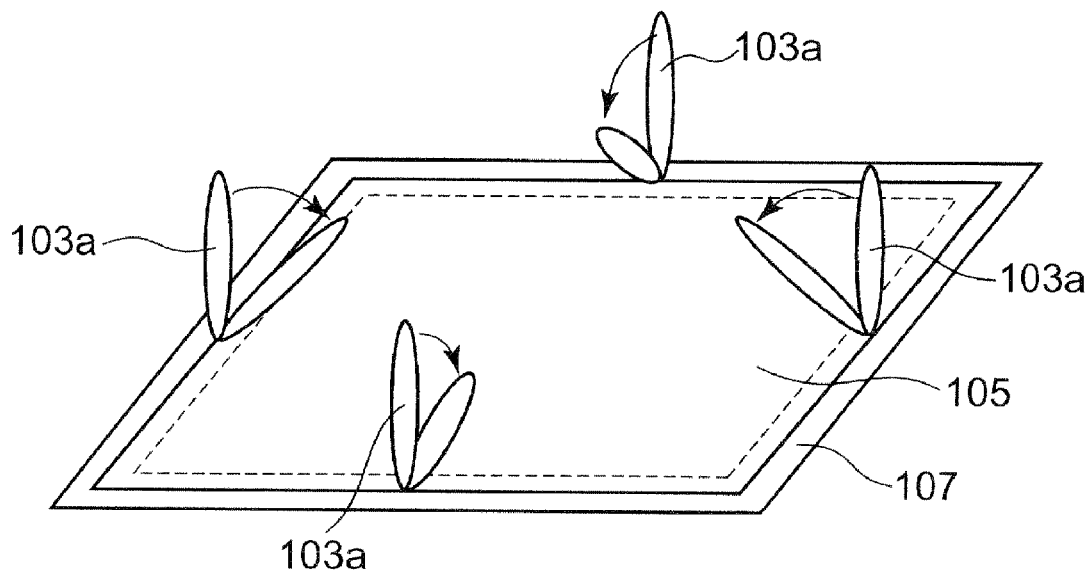
FIG. 4 is an exemplary diagram illustrating the behavior of liquid crystal molecules in one sub-pixel region.
Figure 5:
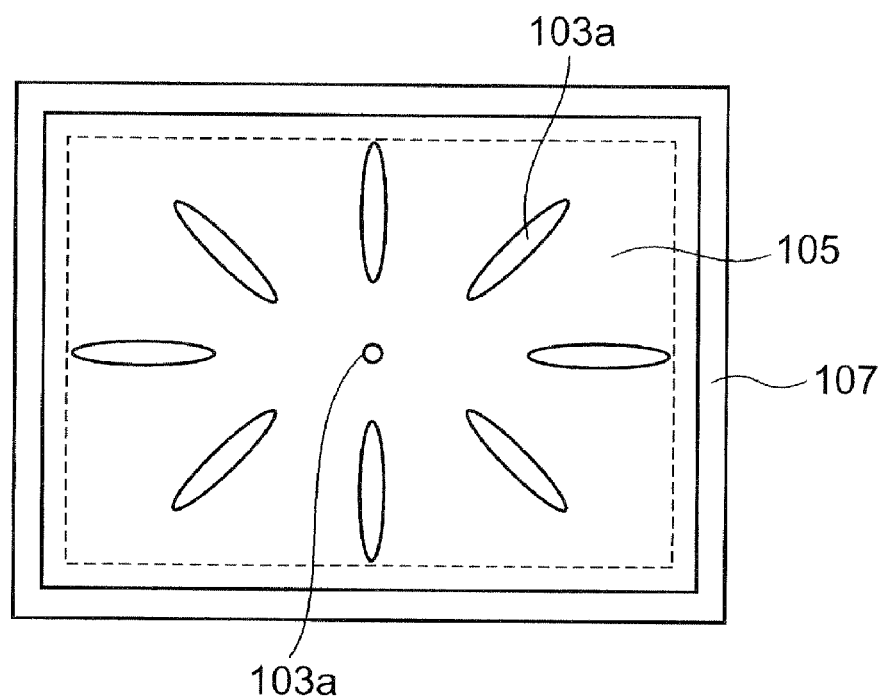
FIG. 5 is an exemplary diagram illustrating the alignment of the liquid crystal molecules in one sub-pixel region.

FIGS. 4 and 5 exemplarily show the aligned state of the liquid crystal molecules in one sub-pixel region. When a voltage is applied between the pixel electrode 105 and the opposing electrode 112, the liquid crystal molecules 103a start tilting toward the center of each sub-pixel region from the periphery thereof for each sub-pixel region, as illustrated in FIG. 4, because of the horizontal electric field around each sub-pixel region and the action of the inclined surface 111a of the alignment film 111 on the periphery of each sub-pixel region. When a sufficiently high voltage is applied between the pixel electrode 105 and the opposing electrode 112, e.g., when a voltage of 3 to 9 V is applied to the pixel electrode 105 and a voltage of −2 to 4 V is applied to the opposing electrode 112, the molecular long axes (directors) of the liquid crystal molecules 103a are aligned substantially in parallel to the surface of the pixel electrode 105 toward the center of each sub-pixel region from the periphery thereof. In this case, because the liquid crystal molecules 103 at the center of each sub-pixel region evenly receive intermolecular forces from the liquid crystal molecules 103a at the periphery tilting toward the center, the liquid crystal molecules 103 are aligned perpendicular to the substrate surface.

As mentioned above, for each sub-pixel region, the liquid crystal molecules 103a have the directors aligned radially from the center of each sub-pixel region.

As described above, the slits 105a extending toward the periphery of the pixel from the center of the pixel region are formed on the pixel electrode 105, and the transparent step film, and the auxiliary electrode corresponding to the periphery of the pixel electrode 105 and the slits 105a are formed on the slits 105a, thereby segmenting one pixel region into a plurality of sub-pixel regions. At the peripheral portion of each segmented sub-pixel region, therefore, the force that makes the liquid crystal molecules tilt toward the center of each sub-pixel region from the periphery thereof even acts from the peripheral portion according to the action of the horizontal electric field generated by the voltage applied between the pixel electrode 105 and the auxiliary electrode 107, and the surface shape of the transparent step film 116, i.e., the inclined surface 111a, the center of alignment is defined, and alignment of the liquid crystal molecules 103a in each sub-pixel region is stabilized. This results in the elimination of the display roughness and display unevenness, providing bright display. Further, as the liquid crystal molecules in each sub-pixel region are radially aligned from the center of the sub-pixel region, the view angle characteristic is improved.

Second Embodiment

Figure 6:
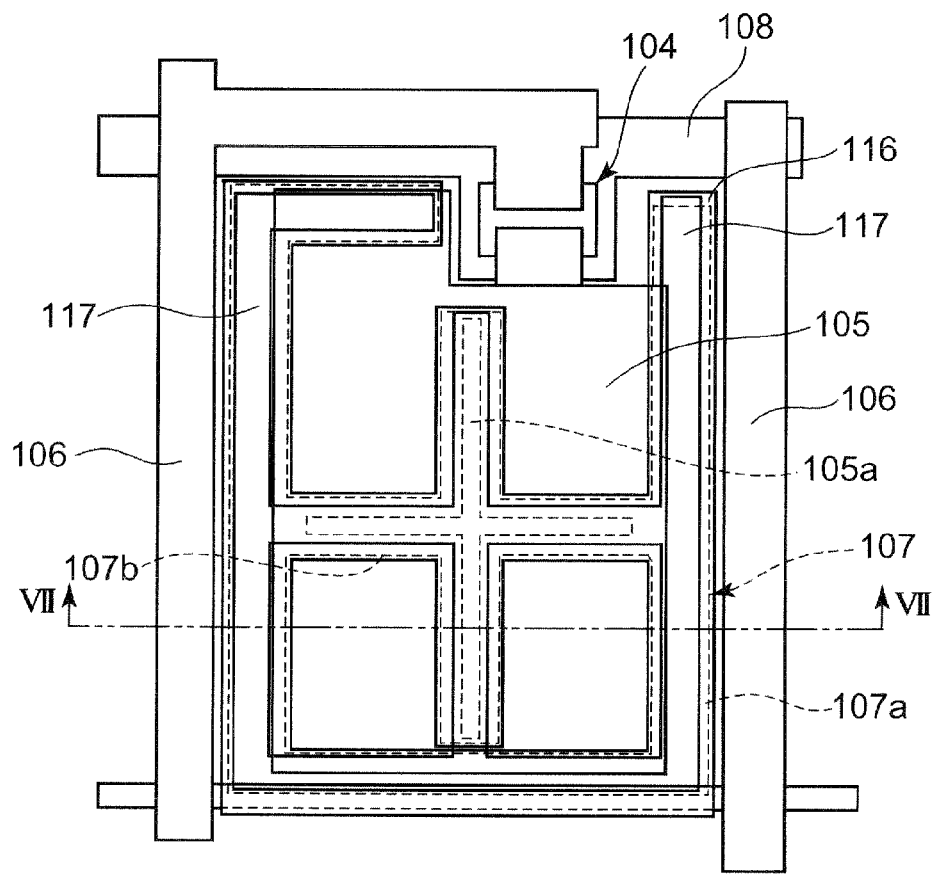
FIG. 6 is a top plan view schematically illustrating the structure of one pixel of a vertical alignment liquid crystal display device according to a second embodiment of the invention.
Figure 7:
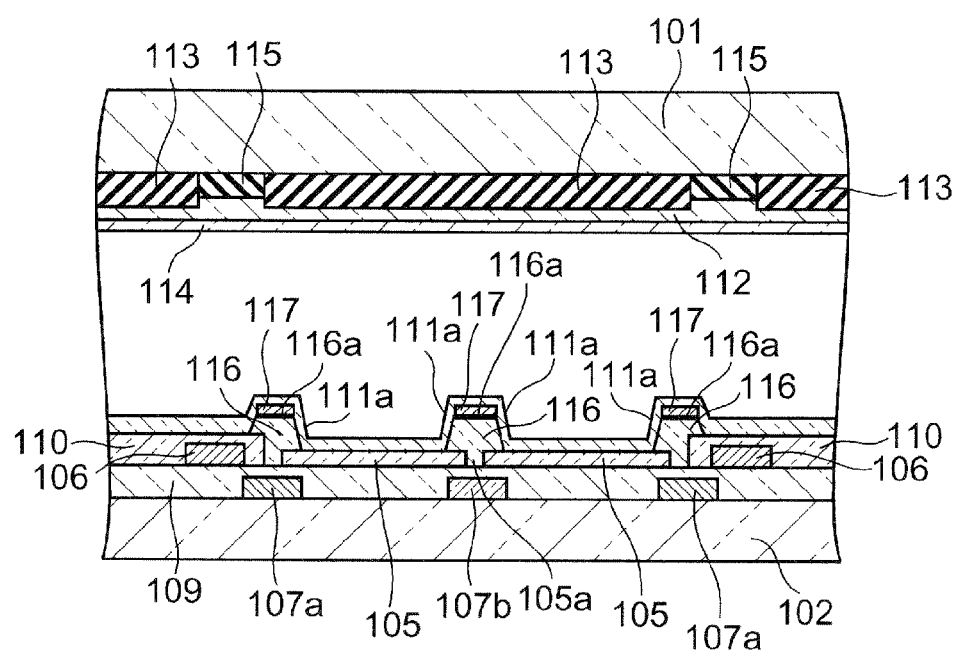
FIG. 7 is a cross-sectional view of one pixel illustrated in FIG. 6 cut along the line VII-VII.

FIG. 6 schematically illustrates the structure of one pixel of a liquid crystal display device according to the second embodiment. FIG. 7 illustrates a cross section taken along the line VII-VII in FIG. 6.

In FIGS. 6 and 7, formed on the inner surface of the TFT substrate 102 are the TFT devices 104, the pixel electrodes 105, the drain lines 106, the auxiliary electrodes 107, the gate lines 108, the gate insulation film 109, the insulation film 110, and the alignment film 111. The opposing electrode 112, the color filter 113, the alignment film 114, and the black mask 115 are formed on the inner surface of the opposing electrode 101. In the embodiment, the same structure portions as those of the first embodiment will be denoted by the same reference numbers to avoid repeating their otherwise redundant descriptions.

In the embodiment, the transparent step film 116 made of a transparent resin material, such as acrylic resin, has a rough surface 116a which is undulated. A reflection metal film 117 of a metal, such as aluminum, is formed on the rough surface 116a of the transparent step film 116. The rough surface 116a of the transparent step film 116, and the reflection metal film 117 formed on the rough surface 116a constitute a scatter reflection surface.

The transparent step film 116 is formed as the rough surface 116a having recesses and projections is formed, by plasma etching, on the transparent step film 116, formed by coating a photoresist liquid containing a transparent resin material, such as acrylic resin, on the inner surface of the TFT substrate 102, and performing patterned exposure on the photoresist film, then the reflection metal film 117 is deposited on the rough surface 116a by deposition of aluminum or the like.

The liquid crystal display device thus obtained scatters and reflects incident light with the scatter reflection film, formed by the undulated rough surface 116a of the transparent step film 116 and the reflection metal film 117, the liquid crystal display device can be used as a reflection type display device so that a semitransparent type liquid crystal display device can be provided.

The invention is not limited to the embodiments, but may be adapted and modified as needed.

In the embodiments, the slits 105a are formed in the pixel electrode 105. However, the slits 105a may be formed on the opposing electrode 112. In this case, it is desirable that the transparent step film 116 should also be formed on the CF substrate 110 where the opposing electrode is laid out. The slits may be formed on both of the pixel electrode 105 and the opposing electrode 112.

In the embodiments, the slits 105a are so formed as to extend toward the peripheral portion along the vertical and horizontal directions from the center portion of the pixel electrode 105. However, the slits 105a have only to be laid out so as to segment the pixel electrode into regions with approximately the same shapes; for example, the slits may be so formed as to extend from the center of the pixel toward the four corners along the diagonal lines. The number of the domains that are segmented by the slits is not limited to four, and may be any integer larger than or equal to two.

Various embodiments and changes may be made thereunto without departing from the broad spirit and scope of the invention. The above-described embodiments are intended to illustrate the present invention not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A liquid crystal display device comprising:
    a first substrate;
    a second substrate arranged opposite to the first substrate;
    a liquid crystal layer with a negative dielectric anisotropy filled between respective opposing surfaces of the first substrate and the second substrate;
    wherein an opposing electrode is formed on the opposing surface of the first substrate, and a TFT device and a pixel electrode connected to a source electrode of the TFT device are formed on the opposing surface of the second substrate;
    wherein an auxiliary electrode is arranged on a lower layer side of the pixel electrode via a first insulation film and is set to an electric potential that is equal to an electric potential of the opposing electrode, and a reflection metal film is deposited on an upper layer side of the pixel electrode via a second insulation film, wherein the lower layer side of the pixel electrode is the side of the pixel electrode where the second substrate is provided, and the upper layer side of the pixel electrode is the side of the pixel electrode where the first substrate is provided;
    wherein the pixel electrode has a slit formed in a predetermined shape;
    wherein the auxiliary electrode, the reflection metal film, and the second insulation film are formed in a shape corresponding to the predetermined shape of the slit with respective areas that are larger than an area of the slit, and the auxiliary electrode, the reflection metal film, and the second insulation film are arranged to overlap the slit; and
    wherein the reflection metal film is formed on the second insulation film such that a step portion of the second insulation film is exposed.

2. The liquid crystal display device according to claim 1, wherein the step portion of the second insulation film is included with respect to the opposing surface of the second substrate.

3. The liquid crystal display device according to claim 1, wherein the slit is cross-shaped.

4. The liquid crystal display device according to claim 1, wherein liquid crystal molecules of the liquid crystal layer are arranged to be aligned perpendicularly with respect to the surfaces near where the molecules are provided when no voltage is applied between the pixel electrode and the opposing electrode.

5. The liquid crystal display device according to claim 1, wherein the pixel electrode is formed with a transparent material.

6. The liquid crystal display device according to claim 1, wherein a surface of the second insulation film contacting the reflection metal film is roughened.

7. The liquid crystal display device according to claim 1, wherein a region of the liquid crystal layer that corresponds to the pixel electrode includes a first region and a second region that is thinner than the first region, and the slit in the pixel electrode overlaps the second region.

8. A liquid crystal display device comprising:
    a first substrate;
    a second substrate arranged opposite to the first substrate;
    a liquid crystal layer with a negative dielectric anisotropy filled between respective opposing surfaces of the first substrate and the second substrate;
    wherein an opposing electrode is formed on the opposing surface of the first substrate, and a TFT device and a pixel electrode connected to a source electrode of the TFT device are formed on the opposing surface of the second substrate;
    wherein an auxiliary electrode is arranged on a lower layer side of the pixel electrode via a first insulation film and is set to an electric potential that is equal to an electric potential of the opposing electrode, and a reflection metal film is deposited on an upper layer side of the pixel electrode via a second insulation film, wherein the lower layer side of the pixel electrode is the side of the pixel electrode where the second substrate is provided, and the upper layer side of the pixel electrode is the side of the pixel electrode where the first substrate is provided;
    wherein the pixel electrode has a slit formed in a predetermined shape;
    wherein the auxiliary electrode, the reflection metal film, and the second insulation film are formed in a shape corresponding to the predetermined shape of the slit with respective widths that are wider than a width of the slit, and the auxiliary electrode, the reflection metal film, and the second insulation film are arranged to overlap the slit; and
    wherein the reflection metal film is formed on the second insulation film such that a step portion of the second insulation film is exposed.

* * * * *